United States Patent
Murayama et al.

(12)

(10) Patent No.: US 6,224,967 B1
(45) Date of Patent: *May 1, 2001

(54) MAGNETIC RECORDING MEDIUM

(75) Inventors: Yuichiro Murayama; Katsuhiko Meguro; Hiroshi Hashimoto, all of Odawara (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,730

(22) Filed: May 21, 1998

(30) Foreign Application Priority Data

May 21, 1997 (JP) .................................................. 9-130823
Dec. 25, 1997 (JP) .................................................. 9-357617

(51) Int. Cl.$^7$ .................................................. G11B 5/702
(52) U.S. Cl. .................. 428/216; 428/323; 428/328; 428/329; 428/425.9; 428/694 BA; 428/694 BS; 428/694 BM; 428/694 BU; 428/694 BL; 428/900
(58) Field of Search .................. 428/688, 689, 428/692, 693, 694 ML, 694 SC, 694 MT, 694 RE, 694 MM, 694 B, 694 BU, 694 BY, 694 BL, 694 BA, 694 BM, 323, 328, 329, 425.9, 900, 216, 694 BS

(56) References Cited

U.S. PATENT DOCUMENTS

| 5,525,418 | * | 6/1996 | Hashimoto et al. .................. 428/323 |
| 5,695,884 | * | 12/1997 | Ishimaru et al. .................. 428/423.1 |
| 5,702,821 | * | 12/1997 | Murayama et al. .............. 428/425.9 |
| 5,747,157 | * | 5/1998 | Hashimoto et al. .................. 428/332 |
| 5,770,302 | * | 6/1998 | Masaki et al. ...................... 428/323 |
| 5,795,645 | * | 8/1998 | Takahashi et al. .................. 428/216 |
| 5,908,691 | * | 6/1999 | Murayama et al. .................. 428/323 |

FOREIGN PATENT DOCUMENTS

| 4-081414 | * | 3/1992 | (JP) . |
| 10-302247 | * | 11/1998 | (JP) . |
| 11-039639 | * | 2/1999 | (JP) . |

* cited by examiner

Primary Examiner—Stevan A. Resan
(74) Attorney, Agent, or Firm—Sughrue, Mion, Zinn Macpeak & Seas, PLLC

(57) ABSTRACT

The present invention provides a magnetic recording medium having high electromagnetic transfer characteristics and good running durability, whereby a polyester polyol comprising an aliphatic dibasic acid and an aliphatic diol component having no cyclic structure is used as a binder, and a polyurethane is contained, which comprises a polyester polyol having an aliphatic diol where 70 mol % or more of the aliphatic diol has alkyl branched side chain having 2 or more carbon atoms, and said polyurethane has urethane group concentration of 3.0 to 4.0 mmol/g, and said ferromagnetic powder has iron with yttrium at a yttrium/iron ratio of 0.5 to 20 atomic % as a major component.

13 Claims, No Drawings

MAGNETIC RECORDING MEDIUM

BACKGROUND OF THE INVENTION

The present invention relates to a magnetic recording medium having excellent electromagnetic transfer characteristics and high durability and comprising at least one or more magnetic layers with ferromagnetic powder and a binder dispersed therein and a lower layer containing at least one of either magnetic powder or non-magnetic powder and a binder dispersed therein, and the lower layer and the magnetic layers are placed on a non-magnetic support.

The magnetic recording medium is widely used in such applications as recording tape, video tape, floppy disk, etc. The magnetic recording medium comprises a magnetic layer having ferromagnetic powder and a binder dispersed in it, and the magnetic layer is laminated on a non-magnetic support.

The magnetic recording medium must be at high level in such characteristics as electromagnetic transfer characteristics, running durability, and running performance. Specifically, an audio tape for reproducing musical sound must have an ability to reproduce original sound with higher quality. A video tape must have high electromagnetic transfer characteristics such as high ability to reproduce original image or picture.

Together with the requirements to have high electromagnetic transfer characteristics, the magnetic recording medium must have good running durability as described above. To improve durability and electromagnetic transfer characteristics, the binder, serving as one of major components of the magnetic layer, plays an important role. When vinyl chloride resin, cellulose resin, urethane resin, acrylic resin, etc. as used in the past are adopted, it is disadvantageous in that abrasive resistance of the magnetic layer is low, and running components of the magnetic tape are contaminated.

Contamination of the magnetic head causes deterioration of electromagnetic transfer characteristics. In particular, in the device for high density recording, number of revolutions of the magnetic head is high. In a digital video tape recorder, number of revolutions of the magnetic head is as high as 9,600 rpm, and this is much higher compared with 1,800 rpm of an analog video tape recorder for household use, and 5,000 rpm of a video tape recorder for business use. Sliding speed between the magnetic recording medium and the magnetic head is getting increasingly higher, and the magnetic head and the thin film head are designed in more and more compact size, and there are strong demands to minimize and to improve the problems of magnetic head contamination caused by components of the magnetic recording medium.

To solve the above problems, there have been proposed several methods to increase hardness of the magnetic layer using hard binder.

For example, JP-A-6-96437 describes a magnetic recording medium, in which a polyester polyurethane having urethane group concentration of 2.5 mmol/g or more and a polyvinyl acetal resin are used. JP-A-7-50010 describes a substance having high urethane group concentration in polyurethane, which contains polyol of 0 to 5 mol %. In both cases, dispersion property is not satisfactory, and none of these inventions describes that an effect is attained by a combination with a specific type of ferromagnetic powder.

JP-A-3-88119 (EP 415,708) discloses a magnetic recording medium, which contains an aliphatic urethane in a lower layer and aromatic urethane in an upper layer. Also, JP-A-6-259746 describes a urethane, which comprises a polyester polyol using branched glycol, cycloapliphatic glycol, and aromatic or cycloaliphatic dibasic acid. JP-A-6-76265 discloses a polyurethane, which comprises a polyester diol using branched polyhydric alcohol, and JP-A-6-314424 describes a polyurethane, which comprises a polyester polyol using 3-methyl-1,5-pentanediol and an aliphatic dicarboxylic acid. However, the polyurethane disclosed in each of these inventions has low glass transition temperature (Tg). This means that the entire coating film or surface of the coating film are softened. When it is used in a video tape, the coating film tends to be fluidized due to sliding and friction with the rotating head, and running durability is decreased. When it is stored under high temperature conditions, the surface of the coating film is softened. This increases friction coefficient and leads to poor running condition.

A magnetic recording medium, which comprises yttrium-containing ferromagnetic powder is disclosed in each of JP-A-7-210856 (U.S. Pat. No. 5,580,399) and JP-A-7-272253. JP-A-7-272253 describes the use of a polyurethane, but it simply gives description on the use of a binder commonly in use, and it is disadvantageous in that it is difficult to disperse ferromagnetic powder because magnetic energy among the ferromagnetic powder particles is high.

It is an object of the present invention to provide a magnetic recording medium, which has ferromagnetic powder with high dispersion property, exhibits excellent electromagnetic transfer characteristics, has coating film surface with high strength and shows very good running durability.

SUMMARY OF THE INVENTION

The magnetic recording medium according to the present invention comprises at least one layer of magnetic layers with ferromagnetic powder and a binder dispersed therein, and the magnetic layers are placed on a non-magnetic support, whereby the magnetic layer contains a polyester polyol, a chain extender, and a polyurethane having urethane group concentration of 3.0 to 4.0 mmol/g and being obtained from an organic diisocyanate as a binder, the ferromagnetic powder contains iron with yttrium/iron atomic ratio (Y/Fe) of 0.5 to 20 atomic % as a major component, the polyurethane is either a polyurethane (1) or a polyurethane (2), the polyurethane (1) is such that a dibasic acid of the polyester polyol contains an aliphatic dibasic acid, and 70 mol % or more of diol component comprises a diol component with no cyclic structure and having an alkyl branched side chain containing 2 or more carbon atoms, and the polyurethane (2) is such that a dibasic acid in the polyester polyol contains an aliphatic dibasic acid, and 70 mol % or more of diol component comprises a polyester polyol having an alkyl branched aliphatic diol containing 2 or more carbon atoms in a branched side chain of a molecule and a chain extender having an alkyl branched aliphatic diol containing 3 or more carbon atoms in a branched side chain of a molecule.

The present invention also provides a magnetic recording medium as described above, wherein the polyurethane is a polyurethane having at least one type of polar group selected from the following groups:

(where M represents a hydrogen atom, an alkali metal or an alkali earth metal, or ammonium, and R represents an alkyl group having 1 to 12 carbon atoms).

The present invention also provides a magnetic recording medium, which comprises a lower layer with magnetic powder or inorganic powder dispersed therein, and at least one layer of magnetic layers with ferromagnetic powder and a binder dispersed therein and being placed on the lower layer, the lower layer and the magnetic layers being placed on a non-magnetic support, whereby the binder either in the lower layer or in the magnetic layer contains a polyester polyol, a chain extender, and a polyurethane having urethane group concentration of 3.0 to 4.0 mmol/g and being obtained from an organic diisocyanate as a binder, said ferromagnetic powder contains iron with yttrium/iron atomic ratio (Y/Fe) of 0.5 to 20 atomic % as a major component, said polyurethane is either a polyurethane (1) or a polyurethane (2), said polyurethane (1) is such that a dibasic acid of the polyester polyol contains an aliphatic dibasic acid, and 70 mol % or more of diol component comprises a diol component with no cyclic structure and having an alkyl branched side chain containing 2 or more carbon atoms, and said polyurethane (2) is such that a dibasic acid in the polyester polyol contains an aliphatic dibasic acid, and 70 mol % or more of diol component comprises a polyester polyol having an alkyl branched aliphatic diol containing 2 or more carbon atoms in a branched side chain of a molecule and a chain extender having an alkyl branched aliphatic diol containing 3 or more carbon atoms in a branched side chain of a molecule.

Also, the present invention provides a magnetic recording medium as described above, wherein said polyurethane is a polyurethane having at least one type of polar group selected from the following groups:

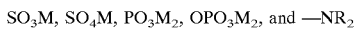

$SO_3M$, $SO_4M$, $PO_3M_2$, $OPO_3M_2$, and $-NR_2$ (where M represents a hydrogen atom, an alkali metal or an alkali earth metal, or ammonium, and R represents an alkyl group having 1 to 12 carbon atoms).

The present invention further provides a magnetic recording medium as described above, wherein the magnetic layer is not more than 0.2 $\mu$m in thickness when dried, and the lower layer is not less than 1 $\mu$m in thickness when dried.

DESCRIPTION OF THE PREFERRED EMBODIMENTS

According to the present invention, ferromagnetic powder containing yttrium (Y), which has high magnetic energy between ferromagnetic powder particles and is difficult to be dispersed, is dispersed using a binder containing a polyurethane, which has high dispersion property and has a specific chemical structure. As a result, it is possible to obtain a magnetic recording medium, which has high electromagnetic transfer characteristics and good running durability.

Specifically, when a tape is stored under high temperature condition, soft components having relatively low molecular weight in polyurethane molecules are very likely to be deposited on the surface of the coating film. It has been found in the present invention that the above disadvantage can be overcome by the use of ferromagnetic powder containing yttrium and of a polyurethane derived from a polyester polyol where an aliphatic diol with an alkyl branched side chain containing 2 or more carbon atoms is introduced. Further, the polyurethane of the present invention has high glass transition temperature (Tg) because it has higher urethane group concentration than the normal case, and better durability can be attained. However, due to high urethane group concentration, solubility in solvent tends to decrease. By the use of diol, which overcomes such problem and has a branched side chain having 2 or more carbon atoms, the solubility in solvent can be improved. Thus, better durability can be attained while maintaining high dispersion property.

As a result, friction coefficient is not increased even when the tape is stored under high temperature condition, and poor running operation of the video tape recorder can be improved.

As the aliphatic diol having branched side chain to be used in the present invention, the following compounds may be used: 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, 5-butyl-1,9-nonanediol, etc.

Above all, the following compounds are preferably used as a diol, which does not have cyclic structure and has an alkyl branched side chain containing 2 or more carbon atoms: 2-ethyl-1,3-hexanediol, 2-butyl-1,3-propanediol, and 2,2-diethyl-1,3-propanediol.

The following compounds are preferably used as an alkyl branched side chain diol containing 2 carbon atoms in a branched side chain of a molecule used in the polyurethane (2): 2,2-dimethyl-1,3-propanediol, and 3,3-dimethyl-1,5-pentanediol.

As the branched aliphatic diol having 3 or more carbon atoms in branched side chain of the molecule to be used in the polyurethane (2), the following compounds may be used: 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, 5-butyl-1,9-nonanediol, etc.

Among these compounds, it is preferable to use 2-ethyl-2-butyl-1,3-propanediol and 2,2-diethyl-1,3-propanediol.

As the aliphatic dibasic acid to be used in the polyester polyol, the following compounds may be used: succinic acid, adipic acid, azelaic acid, sebacic acid, malonic acid, glutaric acid, pimelic acid, suberic acid, etc.

Among these compounds, it is preferable to use succinic acid, adipic acid or sebacic acid.

Among the total dibasic acid component in the polyester polyol, it is preferable that the content of the aliphatic dibasic acid is 70 mol % or more. If it is less than 70 mol %, dibasic acid components having cyclic structure such as aromatic dibasic acid are increased, and this results in lower solubility in solvent and poor dispersion property.

As the organic diisocyanate compound, aromatic diisocyanate such as 2,4-tolylenediisocyanate, 2,6-tolylenediisocyanate, xylene-1,4-diisocyanate, xylene-1,3-diisocyanate, 4-4'-diphenylmethane-diisocyanate, 4,4-diphenyletherdiisocyanate, 2-nitrodiphenyl-4,4'-diisocyanate, 2,2'-diphenylpropane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate, 3,3'-dimethoxydiphenyl-4,4'-diisocyanate, etc., aliphatic diisocyanate such as tetramethylene diisocyanate, hexamethylene diisocyanate, lysine diisocyanate, etc. or cycloaliphatic diisocyanate such as isophoronediisocyanate, hydrogenated tolylenediisocyanate, hydrogenated diphenylmethane diisocyanate, etc. may be used.

It is preferable to use aromatic diisocyanate, or more preferably 4,4-diphenylmethane diisocyanate, 2,2-tolylene diisocyanate, p-phenylene diisocyanate, isophorone diisocyanate.

Weight average molecular weight (Mw) of the polyurethane is preferably 30,000 to 70,000, or more preferably 40,000 to 60,000.

If it is less than 30,000, strength of the coating film is decreased, leading to poor durability. If it is more than 70,000, solubility in solvent is lowered, leading to poor dispersion property.

Glass transition temperature (Tg) of the polyurethane is preferably 50° C. to 150° C., or more preferably 70° C. to 120° C., or most preferably 80° C. to 100° C.

If it is lower than 50° C., strength of the coating film is decreased at high temperature, thus resulting in lower durability and storage property. If it is higher than 150° C., calender workability is decreased, leading to poor electromagnetic transfer characteristics.

As the polar group of the polyurethane, $-SO_3M$, $-OSO_3M$, $-PO_3M_2$, or $-COOM$ are preferably used, or more preferably, $-SO_3M$ or $OSO_3M$. It is preferable that the content of the polar group is $1\times10^{-5}$ eq/g to $2\times10^{-4}$ eq/g. If it is less than $1\times10^{-5}$ eq/g, adsorption to magnetic substance becomes insufficient, and this leads to poor dispersion property. If it is more than $2\times10^{-4}$ eq/g, solubility in solvent is decreased, leading to poor dispersion property.

Urethane group concentration in the polyurethane is preferably in the range of 3.0 to 4.0 mmol/g, or more preferably 3.3 to 3.7 mmol/g. If it is lower than 3.0 mmol/g, glass transition temperature (Tg) of the coating film is decreased, leading to poor durability. If it is more than 4.0 mmol/g, solubility in solvent decreases, resulting in poor dispersion property. Because it cannot necessarily contain polyol, it becomes difficult to adjust molecular weight, and this causes inconveniences in synthesis.

Preferably, 2 to 20 OH groups are contained per molecule in the polyurethane, or more preferably 3 to 15 groups per molecule. If it is less than 3 groups per molecule, reactivity with isocyanate curing agent is decreased, and this reduces the strength of the coating film and leads to poor durability. On the other hand, if it is 15 groups or more per molecule, solubility in solvent decreases, leading to poor dispersion property.

In case the binder of the present invention is used in the magnetic layer, synthetic resin of vinyl chloride type may be simultaneously used with the polyurethane of the present invention. Polymerization degree of the vinyl chloride resin to be used simultaneously is preferably 200 to 600, or more preferably 250 to 450. The vinyl chloride type resin may be copolymerized with vinyl type monomer, e.g. vinyl acetate, vinyl alcohol, vinylidene chloride, acrylonitrile, etc.

In addition to the polyurethane of the present invention and the vinyl chloride type resin, various types of synthetic resin may be used to form the magnetic layers. For example, ethylene/vinyl acetate copolymer, cellulose derivative such as nitrocellulose resin, acrylic resin, polyvinyl acetal resin, polyvinyl butyral resin, epoxy resin, or phenoxy resin. These may be used alone or in combination.

In case the other synthetic resin is simultaneously used, it is preferable that the polyurethane in the magnetic layer is contained in 10 to 90 weight % in the binder, or more preferably in 20 to 80 weight %, or most preferably 25 to 60 weight %. It is preferable that vinyl chloride resin is contained in the binder in 10 to 80 weight %, or more preferably in 20 to 70 weight, or most preferably 30 to 60 weight %.

Curing agent such as polyisocyanate compound may be used together with the binder of the present invention. As the polyisocyanate compounds, the following compounds may be used: reaction product of 3 mols of tolylene diisocyanate and 1 mol of trimethylol propane (e.g. Desmodul L-75; manufactured by Bayer AG), reaction product of 3 mols of diisocyanate such as xylylene diisocyanate or hexamethylene diisocyanate and 1 mol of trimethylolpropane, buret addition product with 3 mols of hexamethylene diisocyanate, isocyanurate compound of 5 mols of tolylene diisocyanate, isocyanurate addition compound of 3 mols of tolylene diisocyanate and 2 mols of hexamethylene diisocyanate, or polymer of isophorone diisocyanate and diphenyl methane diisocyanate.

It is preferable that the polyisocyanate compound in the magnetic layer is contained in the binder at a ratio of 10 to 50 weight %, or more preferably in 20 to 40 weight %.

In case curing treatment is performed with irradiation of electron beam, a compound having reactive double bonding such as urethane acrylate may be used.

It is preferable that total weight of the resin component and the curing agent (i.e. binder) is within a range of 15 to 40 weight parts to 100 weight parts of the ferromagnetic powder, or more preferably in the range of 20 to 30 weight parts.

The ferromagnetic powder used in the magnetic recording medium of the present invention is cobalt-containing ferromagnetic iron oxide or ferromagnetic alloy powder, and it has $S_{BET}$ specific surface area of 40 to 80 m$^2$/g, or more preferably 50 to 70 m$^2$/g. Crystallite size is preferably 12 to 25 nm, or more preferably 13 to 22 nm, or most preferably 14 to 20 nm. Longer axis diameter is preferably 0.05 to 0.25 μm, or more preferably 0.07 to 0.2 μm, or most preferably 0.08 to 0.15 μm. As the ferromagnetic powder, Fe, Fe—Co, Fe—Ni, or Co—Ni—Fe containing yttrium may be used. The content of yttrium in the ferromagnetic powder is preferably such that the ratio of yttrium atoms to iron atoms (Y/Fe) is 0.5 to 20 atomic %, or more preferably 5 to 10 atomic %. If it is lower than 0.5 atomic %, it is not possible to have ferromagnetic powder with higher σ s value. As a result, magnetic characteristics decrease, leading to poor electromagnetic transfer characteristics. If it is higher than 20 atomic %, the iron content is decreased. This leads to lower magnetic characteristics and poor electromagnetic transfer characteristics. Further, any of the following elements may be contained within the range of not more than 20 atomic % to 100 atomic % of iron: aluminum, silicon, sulfur, scandium, titanium, vanadium, chromium, manganese, copper, zinc, molybdenum, rhodium, palladium, gold, tin, antimony, boron, barium, tantalum, tungsten, rhenium, gold, lead, phosphorus, lanthanum, cerium, praseodymium, neodymium, tellurium, bismuth, etc. Also, the ferromagnetic metal powder may contain small quantity of water, hydroxide or oxide.

Description will be given now on an example of the method to manufacture the ferromagnetic powder containing cobalt and yttrium used in the present invention.

Acidic gas is blown into aqueous suspension solution containing ferrous salt mixed with alkali. The iron oxyhydroxide thus prepared may be used as the starting material in this method.

As the iron oxyhydroxide, it is preferable to use α-FeOOH. A first method to manufacture this is as follows: Ferrous salt is neutralized with alkali hydroxide to obtain aqueous suspension solution of $Fe(OH)_2$. Then, acidic gas is blown into the suspension solution, and needle-like α-FeOOH is prepared. On the other hand, there is a second method, in which ferrous salt is neutralized with alkali carbonate to obtain aqueous suspension solution of $FeCO_3$. Acidic gas is blown into the suspension solution and spindle-likeα-FeOOH is prepared. It is preferable that the iron oxyhydroxide is obtained as follows: Aqueous solution of ferrous salt is reacted with alkali aqueous solution, and aqueous solution containing ferrous hydroxide is prepared. Then, this is oxidized by air oxidation. In this case, salt of alkali earth element such as Ni salt, Ca salt, Ba salt, Sr salt, etc. or Cr salt, Zn salt, etc. may coexist in the ferrous salt aqueous solution. By adequately selecting these salts, it is possible to prepare the substance in particulate shape (axial ratio).

As the ferrous salt, it is preferable to use ferrous chloride, ferrous sulfate, etc. As the alkali, sodium hydroxide, aqueous ammonia, ammonium carbonate, sodium carbonate, etc. are preferably used. As the salts, which may coexist in the solution, chloride such as nickel chloride, calcium chloride, barium chloride, strontium chloride, chromium chloride, zinc chloride, etc. may be preferably used.

Next, in case cobalt is introduced to iron, aqueous solution of cobalt compound such as cobalt chloride is stirred up and mixed in a slurry of the iron oxyhydroxide as described above prior to the introduction of yttrium. After the slurry of iron oxyhydroxide containing cobalt has been prepared, aqueous solution containing yttrium compound is added to the slurry, and the solution is agitated and mixed. In this way, cobalt can be introduced.

In the ferromagnetic powder of the present invention, in addition to yttrium, elements such as neodymium, samarium, praseodymium, lanthanum, etc. may be introduced. These can be introduced using chloride such as yttrium chloride, neodymium chloride, samarium chloride, praseodymium chloride, lanthanum chloride, etc. or nitrate such as neodymium nitrate, gadolinium nitrate, etc. Two or more types of these compounds may be simultaneously used.

There is no special restriction on the shape of the ferromagnetic powder. In general, the ferromagnetic powder in needle-like, particulate, cubic, grain-like or planar shape may be used. In particular, it is preferable to use needle-like ferromagnetic powder.

The resin components, the curing agent, and the ferromagnetic powder as given above are kneaded and dispersed together with methylethylketone, dioxane, cyclohexanone, ethyl acetate, etc. used in the preparation of magnetic coating material, and a magnetic coating material is prepared. The kneading and dispersing may be performed according to the procedure commonly known.

The magnetic coating material may contain, in addition to the components given above, abrasive material such as α-$Al_2O_3$, $Cr_2O_3$, etc., anti-static agent such as carbon black, lubricant such as fatty acid, fatty acid ester, silicone oil, etc., or additive or filling agent normally used such as dispersing agent.

Next, description will be given on the lower non-magnetic layer or the lower magnetic layer in case the medium of the present invention is designed in multi-layer structure. Inorganic powder in the lower layer in the present invention may be magnetic powder or non-magnetic powder. For example, in case of non-magnetic powder, inorganic powder can be selected from inorganic compound such as metal oxide, metal carbonate, metal sulfate, metal nitride, metal carbide, metal sulfide, etc. As the inorganic compounds, the following substances are used in combination or alone: For example, α-alumina with alpha ratio of 90%–100% or more, α-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. In particular, it is preferable to use titanium dioxide, zinc oxide, iron oxide or barium sulfate, or more preferably titanium dioxide. Particle size of the non-magnetic powder is preferably in the range of 0.005 to 2 μm. When necessary, non-magnetic powder with different particle sizes may be mixed together or similar effect can be provided with single type of non-magnetic powder by widening the particle size distribution. In particular, it is preferable that average particle size of the non-magnetic powder is 0.01 to 0.2 μm. It is preferable that pH value of the non-magnetic powder is within the range of 6 to 9. Specific surface area of the non-magnetic powder is preferably 1 to 100 $m^2/g$, or more preferably 5 to 50 $m^2/g$, or most preferably 7 to 40 $m^2/g$. Crystallite size of the non-magnetic powder is preferably 0.01 to 2 μm. Oil absorption using DBP is preferably 5 to 100 ml/100 g, or more preferably 10 to 80 ml/100 g, or most preferably 20 to 60 ml/100 g. Specific gravity is preferably 1 to 12, or more preferably 3 to 6. The shape may be any of needle-like, spherical, polyhedron, or planar shape.

It is preferable that surface of the non-magnetic powder is processed by surface treatment using $Al_2O_3$, $SiO_2$, $TiO_2$, $ZrO_2$, $SnO_2$, $Sb_2O_3$, or ZnO. To ensure better dispersion property, it is preferable to use $Al_2O_3$, $SiO_2$, $TiO_2$ or $ZrO_2$, or more preferably $Al_2O_3$, $SiO_2$ or $ZrO_2$. These substances may be used in combination or alone. According to each individual purpose, coprecipitated surface treatment layer may be used, or a method to treat the surface layer using silica after treating with alumina, or a method reversing this procedure may be adopted. The surface treatment layer may be porous according to the purpose. In general, it is preferably homogeneous and dense.

By mixing carbon black in the lower layer, it is possible to decrease the value of Rs as the effect already known and to attain micro Vickers hardness as desired. For this purpose, furnace black for rubber, thermal black for rubber, carbon black for color, acetylene black, etc. may be used.

Specific surface area of the carbon black is preferably 100 to 500 $m^2/g$, or more preferably 150 to 400 $m^2/g$. DBP oil absorption is preferably 20 to 400 ml/100 g, or more preferably 30 to 200 ml/100 g. Particle size of the carbon black is preferably 5 to 80 μm, or more preferably 10 to 50 μm, or most preferably 10 to 40 μm. In the carbon black, it is preferable that pH value is 2 to 10, moisture content is 0.1 to 10%, and tap density is 0.1 to 1 g/ml. Concrete examples of the carbon black to be used in the present invention are as follows: Blackpearls 2000, 1300, 1000, 900, 800, 880, 700, and Vulcan XC-72 (manufactured by Cabot), #3050B, #3150B, #3250B, #3750B, #3950B, #950B, #650B, #970B, #850B, and MA-600 (manufactured by Mitsubishi Chemical Industry Co., Ltd.), Conductex SC, Raven 8800, 8000, 7000, 5750, 5250, 3500, 2100, 2000, 1800, 1500, 1255, and 1250 (manufactured by Columbia Carbon Co.), and Ketchenblack EC (manufactured by Akzo).

In the lower layer of the present invention, magnetic powder may also be used. As the magnetic powder, an alloy having $\alpha$-$Fe_2O_3$, Co-denatured $\alpha$-$Fe_2O_3$, or $\alpha$-Fe as principal component, or $CrO_2$ may be used. In particular, it is preferable to use Co-denatured $\alpha$-$Fe_2O_3$. The ferromagnetic powder used in the lower layer of the present invention has preferably composition and performance characteristics similar to those of the ferromagnetic powder used in the upper magnetic layer. However, the performance characteristics may be varied in the upper and the lower layers as already known according to each individual purpose. For example, to improve long wavelength recording characteristics, it is desirable to set the value of Hc of the lower magnetic layer to a value lower than that of the upper magnetic layer. Also, it is more effective to set the value of Br in the lower magnetic layer to a value higher than that of the upper magnetic layer. Further, advantages can be provided by adopting a multi-layer structure as already known.

As binder, lubricant, dispersing agent, additive, solvent, dispersing method, etc. of the lower magnetic layer or the lower non-magnetic layer, those for the magnetic layer can be applied. In particular, for quantity and type of binder, and quantity and type of additive and dispersing agent, the technique already known for the magnetic layer may be applied.

The magnetic coating material prepared from the above materials is coated on the non-magnetic support, and a magnetic layer is formed.

As the non-magnetic support used in the present invention, polyethylene naphthalate, polyethylene terephthalate, polyamide, polyimide, polyamideimide, aromatic polyamide, polybenzoxydazole, etc. processed by biaxial stretching may be used. More preferably, polyethylene naphthalate or aromatic polyamide may be used. These non-magnetic supports may be processed in advance by corona discharge, plasma treatment, treatment to make more easily adhesive, heat treatment, etc. The non-magnetic support used in the present invention has preferably such surface smoothness that average surface roughness at central line is in the range of 0.1 to 20 nm under cut-off value of 0.25 mm, or more preferably in the range of 1 to 10 nm. It is also preferable that the non-magnetic support not only has lower average surface roughness at central line but also has no excessive projection of more than 1 μm.

The magnetic recording medium of the present invention can be manufactured, for example, by the following method: On the surface of a non-magnetic support under running condition, a coating solution for the magnetic layer is coated so that thickness of the magnetic layer after drying will be within the range of 0.05 to 3.0 μm, or more preferably 0.07 to 1.0 μm. In this case, a plurality of magnetic coating materials may be coated in multiple layers sequentially or at the same time.

As coating device to coat the above magnetic coating material, the following devices may be used: air doctor coat, blade coat, rod coat, extrusion coat, air knife coat, squeeze coat, impregnation coat, reverse roll coat, transfer roll coat, gravure coat, kiss coat, cast coat, spray coat, spin coat, etc.

For further details, reference should be made, for example, to "The Newest Coating Technique" published by Sogo Gijutsu Center, Ltd. (May 31, 1983).

In case the present invention is applied to a magnetic recording medium comprising two layers or more, the following can be recommended as examples of the coating device and method:

(1) Using a coating device such as gravure, roll, blade, extrusion, etc. generally applied in the coating of the coating material, the lower layer is coated at first. While the lower layer is not yet dried, the upper layer is coated using a support pressurizing type extrusion coating device as disclosed, for example, in JP-B-1-46186, JP-A-60-238179, JP-A-2-265672, etc.

(2) Using a coating head having two slits for allowing the coating solution to pass as disclosed in JP-A-63-88080, JP-A-2-17971 or JP-A-2-265762, the upper and the lower layers are coated almost at the same time.

(3) Using an extrusion coating device equipped with backup roll as disclosed in JP-A-2-174965, the upper and the lower layers are coated almost at the same time.

On the surface (where the coating material is not coated) of the non-magnetic support used in the present invention, a back-coating layer (backing layer) may be provided. The back-coating layer is a layer, which is produced by coating a coating material to form back-coating layer (i.e. a coating material where particulate components such as abrasive material, anti-static material, etc. and the binder are dispersed in an organic solvent) on the uncoated surface of the non-magnetic support.

An adhesive layer may be provided on the surface of the non-magnetic support coated with the magnetic coating material and also with the coating material to form back-coating layer.

The coating layer coated with the magnetic coating material is dried after magnetic field orientation processing is performed on the ferromagnetic powder contained in the coating layer of the magnetic coating material.

After it has been dried as described above, surface smoothening treatment is carried out on the coating layer. For the surface smoothening treatment, super calender roll is used, for example. By the surface smoothening treatment, the holes generated due to removal of the solvent during drying are eliminated, and filling ratio of the ferromagnetic powder in the magnetic layer is improved. This makes it possible to obtain a magnetic recording medium having high electromagnetic transfer characteristics.

As the calender processing roll, heat-resistant plastic roll made of epoxy, polyimide, polyamide, polyamideimide, etc. is used. Or, a metal roll may be used.

It is preferable that the magnetic recording medium according to the present invention has surface with such good smoothness that average roughness along the central line of the surface is preferably within the range of 0.1 to 4 nm under the cut-off value of 0.25 mm, or more preferably within the range of 1 to 3 nm. To attain such surface smoothness, calender treatment is performed on the magnetic layer, which is formed by selecting specific types of the ferromagnetic powder and the binder as described above. The conditions for the calender treatment are as follows: Temperature of calender roll is preferably within the range of 60 to 100° C., or more preferably 70 to 100° C., or most preferably 80 to 100° C. Pressure is preferably within the range of 100 to 500 kg/cm$^2$, or more preferably 200 to 450 kg/cm$^2$, or most preferably 300 to 400 kg/cm$^2$.

The laminated substance processed by curing treatment as described above is cut into the shape as desired.

As described above, the polyurethane of the present invention contains the aliphatic dibasic acid and more quantity of the branched aliphatic diol than the conventional product as the polyol component. As a result, it has higher solubility in solvent, and dispersion property of the ferromagnetic powder is higher. Further, it has higher urethane group concentration, and this leads to higher Tg value than the conventional type aliphatic urethane. Thus, better running durability can be attained.

The increase of concentration of the urethane group, which is hydrogen-bonded component, means the improvement of interaction between molecules in the dried coating film and also the improvement of strength of the coating film such as Tg. On the other hand, solubility in solvent is decreased, and viscosity of the coating solution is increased, and this results in lower dispersion property. In the polyurethane of the present invention, urethane group concentration is high and solubility in solvent is not decreased because the aliphatic dibasic acid and the branched aliphatic diol are used as polyester polyol component. This may be attributable to the fact that the branched compound prevents association between molecules of polyurethane in the coating solution.

(Embodiments)

In the following, detailed description will be given on the features of the present invention referring to examples.

In the following, the term "part(s)" means "weight part(s)", and the symbol "%" indicates "weight %".

(Synthesis Example of Polyurethane)

In a container equipped with reflux condenser and agitator and the air inside the container replaced with nitrogen in advance, the polyester polyol shown in Table 1 and diol of the chain extender shown in Table and DEIS (dimethylester sulfodiisophthalate) were dissolved in cyclohexanone at 60° C. under nitrogen stream. In Table 1, blending quantity is shown in mol %. Molecular weight was obtained by hydroxyl value.

Next, di-n-dibutyl tin laurate (60 ppm) was added as catalyst, and this was dissolved for 15 minutes. Further, 4,4'-diphenylmethane diisocyanate (MDI) was added in the quantity shown in Table 2, and thermal reaction was performed at 90° C. for 6 hours, and a polyurethane solution was prepared. Weight average molecular weight and glass transition temperature of the polyurethane prepared are shown in Table 2.

TABLE 1

| | Constituents | Type of polyester polyol | | | | | | | | | | | | | | |
|---|---|---|---|---|---|---|---|---|---|---|---|---|---|---|---|---|
| | | a | b | c | d | e | f | g | h | i | j | k | l | m | n | o |
| Dibasic acid | Adipic acid | 100 | 100 | 100 | 100 | 100 | 100 | 100 | 100 | 100 | 83 | | | 70 | 70 | 90 |
| | Terephthalic acid | | | | | | | | | | | 49 | | | | |
| | 2,6-naphthalene dicarboxylic acid | | | | | | | | | | | | 28 | | | |
| | Isophthalic acid | | | | | | | | | | | 49 | 70 | | | |
| | 5-sodium sulfoisophthalic acid | | | | | | | | | | 17 | 49 2 | 70 2 | 30 | 30 | 10 |
| Branched glycol | 2-ethyl-1,3-hexanediol | 70 | | | 100 | | | 80 | | | | | | | | |
| | 2-ethyl-2-butyl-1,3-propanediol | | 70 | | | 100 | | | 60 | | | 60 | 80 | | | |
| | 2,2-diethyl-1,3-propanediol | | | 70 | | | 100 | | | 60 | | | | | | |
| | 2,2-dimethyl-1,3-propanediol | | | | | | | | | | | | | 100 | | 100 |
| | 3,3-dimethyl-1,5-pentanediol | | | | | | | | | | | | | | 100 | |
| | 3-methyl-1,5-pentanediol | | | | | | | | | | 100 | | | | | |
| Others | 1,6-hexanediol | 30 | 30 | 30 | | | | 40 | 40 | 40 | | | | | | |
| | Ethylene glycol | | | | | | | | | | | 40 | 20 | | | |
| | Molecular weight | 620 | 620 | 650 | 625 | 584 | 621 | 610 | 580 | 605 | 1000 | 1800 | 2300 | 625 | 630 | 650 |

TABLE 2

| Polyurethane | Polyester polyol | | Chain extender | | Diisocyanate | | Urethane group concentration (mmol/g) | Weight average molecular weight | Tg (° C.) |
|---|---|---|---|---|---|---|---|---|---|
| | Type and q'ty (mol) | | Type and q'ty (mol) | | DEIS (mol) | MDI (mol) | | | |
| A | a | 24 | 2-ethyl-1,3-hexanediol | 26 | 2 | 48 | 3.1 | 41000 | 64 |
| B | b | 23 | 2-ethyl-2-butyl- | 27 | 2 | 48 | 3.1 | 42000 | 72 |

TABLE 2-continued

| Poly-urethane | Polyester polyol Type and q'ty (mol) | | Chain extender Type and q'ty (mol) | | DEIS (mol) | Diiso-cyanate MDI (mol) | Urethane group concen-tration (mmol/g) | Weight average molecu-lar weight | Tg (° C.) |
|---|---|---|---|---|---|---|---|---|---|
| C | c | 25 | 1,3-propanediol 2,2-diethyl-1,3-propanediol | 25 | 2 | 48 | 3.0 | 39000 | 76 |
| D | d | 25 | 2-ethyl-1,3-hexanediol | 25 | 2 | 48 | 3.0 | 36000 | 79 |
| E | e | 25 | 2-ethyl-2-butyl-1,3-propanediol | 25 | 2 | 48 | 3.1 | 37000 | 82 |
| F | f | 25 | 2,2-diethyl-1,3-propanediol | 25 | 2 | 48 | 3.0 | 38000 | 83 |
| G | g | 10 | 2-ethyl-1,3-hexanediol | 40 | 2 | 48 | 3.9 | 37000 | 86 |
| H | g | 24 | 2-ethyl-1,3-hexanediol | 26 | 2 | 48 | 3.1 | 41000 | 46 |
| I | h | 24 | 2-ethyl-2-butyl-1,3-propanediol | 26 | 2 | 48 | 3.2 | 38000 | 39 |
| J | i | 25 | 2,2-diethyl-1,3-propanediol | 25 | 2 | 48 | 3.1 | 38000 | 32 |
| K | j | 10 | 2-ethyl-2-butyl-1,3-propanediol | 40 | 0 | 48 | 3.4 | 76000 | 63 |
| L | k | 23 | Neopentyl glycol hydroxypivalate | 29 | 0 | 48 | 1.6 | 36000 | 65 |
| M | l | 19 | Neopentyl glycol hydroxypivalate | 30 | 0 | 50 | 1.6 | 41000 | 68 |
| N | a | 5 | 2-ethyl-1,3-hexanediol | 45 | 2 | 48 | 4.3 | 38000 | 83 |
| O | a | 35 | 2-ethyl-1,3-hexanediol | 15 | 2 | 48 | 2.6 | 41500 | 45 |
| P | m | 22 | 2-ethyl-2-butyl-1,3-propanediol | 25 | 0 | 53 | 3.4 | 38000 | 92 |
| Q | n | 23 | 2-ethyl-2-butyl-1,3-propanediol | 26 | 0 | 51 | 3.2 | 36500 | 95 |
| R | o | 20 | 2-ethyl-2-butyl-1,3-propanediol | 25 | 0 | 55 | 3.6 | 37800 | 83 |
| S | o | 20 | 2,2-diethyl-1,3-propanediol | 27 | 0 | 53 | 3.6 | 41000 | 85 |
| T | o | 20 | 2,2-dimethyl-1,3-propanediol | 25 | 0 | 55 | 3.7 | 38600 | 86 |

EXAMPLE 1

Using an open kneader, 100 parts of ferromagnetic alloy powder (composition: Co/Fe 5 atomic %, Y/Fe 6 atomic %, Hc 2,000 Oe; crystallite size 15 nm; BET specific surface area 59 m²/g; longer axis diameter 0.12 μm; acicular ratio 7; σ s 150 emu/g) were pulverized for 10 minutes. Then, this was kneaded with 20 parts (solid) of polyurethane A and 60 parts of cyclohexanone for 60 minutes. Then, the following compounds were added:

Abrasive material ($Al_2O_3$ particle size 0.3 μm) 2 parts
Carbon black (particle size 40 nm) 2 parts
Methylethylketone/toluene=1/1 200 parts The mixture was then dispersed in a sand mill for 120 minutes. Then, the following compounds were added:

Polyisocyanate 5 parts (Nippon Polyurethane Co.; Coronate 3041) (solid)
Butyl stearate 2 parts
Stearic acid 1 part
Methylethylketone 50 parts Further, the mixture was agitated and mixed for 20 minutes and was filtered using a filter having average pore size of 1 μm, and a magnetic coating material was prepared.

Next, as adhesive layer, polyester resin containing sulfonic acid was coated on the surface of a polyethylene naphthalate support of 10 μm in thickness using a coil bar to have the thickness of 0.1 μm when dried.

Then, the non-magnetic coating material prepared was coated in thickness of 2.0 μm, and immediately thereafter, the magnetic coating material for the upper layer was coated to have the thickness of 0.1 μm when dried using a reverse roll by simultaneous multi-layer coating. On the non-magnetic support with the magnetic coating material coated on it, magnetic field orientation was performed using a magnet of 3000 gauss while the magnetic coating material was not yet dried. Further, after drying, calender treatment was performed (speed 100 m/min.; linear pressure 300 kg/cm; temperature 90° C.) by a combination of metal roll-metal roll-metal roll-metal roll-metal roll-metal roll-metal roll. Then, the product was cut off to have width of 6.35 mm, and a magnetic tape was prepared.

EXAMPLES 2 to 7

Comparative Examples 1 to 8

Magnetic tapes of Example 2 to 7 and Comparative examples 1 to 8 were prepared by the same procedure as in Example 1 except that the polyurethane A was replaced with the polyurethane shown in Table 3.

EXAMPLE 8

A magnetic tape was prepared by the same procedure as in Example 1 except that the composition of the ferromagnetic alloy powder was changed to: Y/Fe 0.5 atomic % and Co/Fe 5 atomic %.

EXAMPLE 9

A magnetic tape was prepared by the same procedure as in Example 1 except that the composition of the ferromagnetic alloy powder was changed to: Y/Fe 20 atomic % and Co/Fe 5 atomic %.

EXAMPLE 10

Magnetic coating solution of Example 1 was used as the magnetic solution for the upper layer.
(Preparation of the Non-magnetic Solution for the Lower Layer)

Using an open kneader, 85 parts of α-$Fe_2O_3$ (average particle size 0.15 μm; BET specific surface area 52 $m^2$/g; $Al_2O_3$ and $SiO_2$ were present due to surface treatment; pH 6.5 to 8.0) were pulverized for 10 minutes. Then, 7.5 parts of a compound ($SO_3Na=6\times10^{-5}$ eq/g; epoxy=$10^{-3}$ eq/g; Mw=30,000) which was obtained by adding sodium hydroxyethyl sulfonate to copolymer of vinyl chloride/vinyl acetate/glycidyl methacrylate (86:9:5), 10 parts (solid) of the polyurethane A containing sulfonic acid, and 60 parts of cyclohexanone were kneaded for 60 minutes. Then, the following compound was added:

Methylethylketone (6/4) 200 parts
and the mixture was dispersed in a sand mill for 120 minutes. Then, the following compounds were added:

Butyl stearate 2 parts

Stearic acid 1 part

Methylethylketone 50 parts
After agitating and mixing for 20 minutes, the mixture was filtered using a filter having average pore size of 1 μm, and a non-magnetic coating material for the lower layer was prepared.

Next, as adhesive layer, polyester resin containing sulfonic acid was coated on the surface of a polyethylene naphthalate support of 10 μm in thickness using a coil bar to have the thickness of 0.1 μm when dried.

Then, the non-magnetic coating material prepared was coated in thickness of 2.0 μm, and immediately thereafter, the magnetic coating material for the upper layer was coated to have the thickness of 0.1 μm when dried using a reverse roll by simultaneous multi-layer coating. On the non-magnetic support with the magnetic coating material coated on it, magnetic field orientation was performed using a magnet of 3000 gauss while the magnetic coating material was not yet dried. Further, after drying, calender treatment was performed (speed 100 m/min.; linear pressure 300 kg/cm; temperature 90° C.) by a combination of metal roll-metal roll-metal roll-metal roll-metal roll-metal roll-metal roll. Then, the product was cut off to have width of 6.35 mm, and a magnetic tape was prepared.

Comparative Example 9

A video tape was prepared by the same procedure as in Example 1 except that the composition of the ferromagnetic alloy powder was changed to: Co/Fe 5 atomic %.

Comparative Example 10

A video tape was prepared by the same procedure as in Example 1 except that the composition of the ferromagnetic alloy powder was changed to: Y/Fe 25 atomic % and Co/Fe 5 atomic %.

Comparative Example 11

A video tape was prepared by the same procedure as in Example 10 except that the polyurethane A was replaced with the polyurethane H.

Comparative Example 12

A video tape was prepared by the same procedure as in Example 10 except that the polyurethane A was replaced with the polyurethane T.

Then, characteristics of the video tapes of Examples and Comparative examples were measured by the measuring method given below. The results of the measurement are summarized in Table 3.

TABLE 3

|  | Content of Y in ferromagnetic powder (atomic %) | Polyurethane | Increasing ratio of friction coefficient due to storage at 60° C. | SQ | Electromagnetic transfer characteristics (dB) | Head contamination | Output decrease (dB) | Dropout increase (number of dropouts) |
|---|---|---|---|---|---|---|---|---|
| Example 1 | 6 | A | 15 | 0.88 | 0.5 | Very good | −0.1 | 8 |
| Example 2 | 6 | B | 15 | 0.89 | 0.5 | Very good | −0.2 | 7 |
| Example 3 | 6 | C | 10 | 0.88 | 0.6 | Very good | −0.1 | 8 |
| Example 4 | 6 | D | 20 | 0.88 | 0.6 | Very good | −0.1 | 8 |
| Example 5 | 6 | E | 15 | 0.88 | 0.8 | Very good | −0.1 | 7 |
| Example 6 | 6 | F | 10 | 0.88 | 0.7 | Very good | −0.1 | 10 |
| Example 7 | 6 | G | 15 | 0.88 | 0.7 | Very good | −0.3 | 10 |
| Example 8 | 0.5 | A | 30 | 0.87 | 0.7 | Very good | −0.2 | 10 |
| Example 9 | 20 | A | 10 | 0.90 | 0.8 | Very good | −0.3 | 5 |
| Example 10 | 6 | A | 23 | 0.90 | 0.7 | Very good | −0.3 | 7 |
| Example 11 | 6 | P | 15 | 0.88 | 0.7 | Very good | −0.1 | 6 |
| Example 10 | 6 | Q | 18 | 0.88 | 0.8 | Very good | −0.2 | 8 |
| Example 10 | 6 | R | 20 | 0.88 | 0.7 | Very good | −0.1 | 5 |
| Example 10 | 6 | S | 15 | 0.88 | 0.8 | Very good | −0.1 | 7 |
| Comparative example 1 | 6 | H | 120 | 0.82 | 0.0 | No good | −0.7 | 20 |
| Comparative example 2 | 6 | I | 83 | 0.83 | 0.0 | No good | −0.7 | 23 |
| Comparative example 3 | 6 | J | 110 | 0.80 | −0.2 | No good | −0.8 | 20 |

TABLE 3-continued

| | Content of Y in ferromagnetic powder (atomic %) | Polyurethane | Increasing ratio of friction coefficient due to storage at 60° C. | SQ | Electromagnetic transfer characteristics (dB) | Head contamination | Output decrease (dB) | Dropout increase (number of dropouts) |
|---|---|---|---|---|---|---|---|---|
| Comparative example 4 | 6 | K | 85 | 0.84 | 0.3 | No good | −1.1 | 35 |
| Comparative example 5 | 6 | L | 86 | 0.78 | −0.7 | No good | −0.5 | 17 |
| Comparative example 6 | 6 | M | 90 | 0.83 | −0.2 | No good | −1.1 | 24 |
| Comparative example 7 | 6 | N | 78 | 0.83 | −0.3 | No good | −0.6 | 22 |
| Comparative example 8 | 6 | O | 80 | 0.83 | −0.4 | No good | −0.7 | 23 |
| Comparative example 9 | 0 | A | 76 | 0.81 | −0.1 | No good | −0.7 | 20 |
| Comparative example 10 | 25 | A | 50 | 0.84 | 0.4 | No good | −0.7 | 23 |
| Comparative example 11 | 6 | H | 100 | 0.79 | 0.0 | No good | −0.9 | 20 |
| Comparative example 12 | 6 | T | 85 | 0.83 | 0.2 | No good | −0.7 | 17 |

(Measuring Method)
(1) Electromagnetic Transfer Characteristics

Using a digital video tape recorder (manufactured by Matsushita Electric; NV-BJ1), a signal with recording wavelength of 0.5 μm was recorded on a specimen tape, and the signal was then reproduced. Reproduction output of the signal recorded on the standard tape (Comparative example 1) was regarded as 0 dB, and relative reproducing output of the tape was measured.

(2) SQ

Using a vibration specimen type magnetic flux meter (Toei Industry), measurement was made with Hm:5 kOe.

(3) Repeated Running Property

A tape of 60-minute length was repeatedly run on the video tape recorder of (1) above continuously for 100 passes under the condition of 40° C. and 80% relative humidity. The contamination of the video head was checked, and video output was continuously recorded. Output decrease was measured with the initial output as 0 dB.

Video head contamination
  Very good . . . when no contamination was observed
  No good . . . when contamination was found by visual inspection (4) Dropout Increase The tape was repeatedly run by 100 passes for 5 minutes under the condition of 23° C. and 10% relative humidity using the video tape recorder of (1) above, and number of dropouts was determined when output was decreased by more than −10 dB for 15 seconds or more.

(5) Change of Friction Coefficient After Storage at High Temperature

A tape of 6.35 mm in width was brought on a stainless steel bar (SUS 420J) of 4 mm in diameter by tensile strength of 20 g (T1) at a winding angle of 180°. Tensile strength (T2) was determined when the tape was run by 100 passes along a length of 100 mm at a speed of 14 mm/sec., and friction coefficient was obtained according to the equation given below. Also, a tape of 60-minute length in reeled state was placed in a closed container with silica gel inside, and this was stored for one week in an oven kept at 60° C. Then, friction coefficient was measured, and it was expressed in a ratio, regarding the friction coefficient prior to storage as 100.

In the magnetic recording medium of the present invention, there was no increase of friction coefficient due to storage at high temperature. Also, dispersion property of the magnetic powder was improved, and better electromagnetic transfer characteristics were exhibited. Further, surface strength of the magnetic layer was higher, and improvement was noted in head contamination and output decrease after repeated running operation. As unexpected effects, tape edge crack was decreased in a recording medium of tape type. Thus, dropout increase was reduced, a magnetic recording medium having high durability and good electromagnetic transfer characteristics was obtained.

What we claim is:

1. A magnetic recording medium, comprising at least one magnetic layer containing dispersed therein ferromagnetic powder and a binder, and a non-magnetic support for said at least one magnetic layer, wherein said at least one magnetic layer contains a polyurethane binder obtained by reacting polyester polyol, a chain extender, and an organic diisocyanate, said polyurethane binder having a urethane group concentration of 3.0 to 4.0 mmol/g, said ferromagnetic powder comprises iron and yttrium, said ferromagnetic powder having a yttrium/iron atomic ratio (Y/Fe) of 0.5 to 20 atomic %, and said polyurethane is either a polyurethane (1) or a polyurethane (2), wherein for said polyurethane (1) said polyester polyol is obtained by reacting a dibasic acid and a diol, said dibasic acid being an aliphatic dibasic acid, and 70 mol % or more of said diol comprises a diol with no cyclic structure and having an alkyl branched side chain containing 2 or more carbon atoms, and for said polyurethane (2) said polyester polyol is obtained by reacting a dibasic acid, a diol and a chain extender, said dibasic acid being an aliphatic dibasic acid, and 70 mol % or more of said diol comprises an alkyl branched aliphatic diol containing 2 or more carbon atoms in a branched side chain thereof and said chain extender comprises an alkyl branched aliphatic diol containing 3 or more carbon atoms in a branched side chain thereof.

2. A magnetic recording medium according to claim 1, wherein said polyurethane is a polyurethane having at least one polar group selected from the group consisting of:

$SO_3M$, $SO_4M$, $PO_3M_2$, $OPO_3M_2$, and $—NR_2$ where M represents a hydrogen atom, an alkali metal or an alkali earth metal, or ammonium, and R represents an alkyl group having 1 to 12 carbon atoms.

3. A magnetic recording medium, comprising a lower layer with magnetic powder or inorganic powder dispersed therein, at least one magnetic layer containing dispersed therein ferromagnetic powder and a binder, and a non-magnetic support, said at least one magnetic layer being placed on said lower layer, and said lower layer and said at least one magnetic layer being placed on said non-magnetic support, wherein either said binder in said lower layer or said at least one magnetic layer is a polyurethane binder obtained by reacting a polyester polyol, a chain extender, and an organic diisocyanate, said polyurethane binder having a urethane group concentration of 3.0 to 4.0 mmol/g, said ferromagnetic powder contains iron and yttrium, said ferromagnetic powder having a yttrium/iron atomic ratio (Y/Fe) of 0.5 to 20 atomic %, and said polyurethane is either a polyurethane (1) or a polyurethane (2), wherein for said polyurethane (1) said polyester polyol is obtained by reacting a dibasic acid and a diol, said dibasic acid being an aliphatic dibasic acid, and 70 mol % of more of said diol comprises a diol with no cyclic structure and having an alkyl branched side chain containing 2 or more carbon atoms, and for said polyurethane (2) said polyester polyol is obtained by reacting a dibasic acid, a diol and a chain extender, said dibasic acid being an aliphatic dibasic acid, and 70 mol % or more of said diol comprises an alkyl branched aliphatic diol containing 2 or more carbon atoms in a branched side chain thereof and said chain extender comprises an alkyl branched aliphatic diol containing 3 or more carbon atoms in a branched side chain thereof.

4. A magnetic recording medium according to claim 3, wherein said polyurethane is a polyurethane having at least one polar group selected from the group consisting of: $SO_3M$, $SO_4M$, $PO_3M_2$, $OPO_3M_2$, and $—NR_2$ where M represents a hydrogen atom, an alkali metal or an alkali earth metal, or ammonium, and R represents an alkyl group having 1 to 12 carbon atoms.

5. A magnetic recording medium according to one of claims 3 or 4, wherein said at least magnetic layer is not more than 0.2 $\mu$m in thickness when dried, and said lower layer is not less than 1 $\mu$m in thickness when dried.

6. A magnetic recording medium according to one of claims 1 to 4, wherein said ferromagnetic powder has a crystallite size of 12 to 25 nm.

7. A magnetic recording medium according to one of claims 1 to 4, wherein said ferromagnetic powder has a longer axis diameter of 0.05 to 0.25 $\mu$m.

8. A magnetic recording medium according to claims 1 to 4, wherein said ferromagnetic powder has a specific surface area of 40 to 80 $m^2/g$.

9. A magnetic recording medium according to claims 3 or 4, wherein said non-magnetic powder of said lower layer has an average particle size of 0.01 to 0.2 $\mu$m.

10. A magnetic recording medium according to claims 3 or 4, wherein said non-magnetic powder of said lower layer has a specific surface area of 1 to 100 $m^2/g$.

11. A magnetic recording medium according to claims 3 or 4, wherein said non-magnetic powder of said lower layer has a pH value of 6 to 9.

12. A magnetic recording medium according to one of claims 3 or 4, wherein said non-magnetic powder of said lower layer has a true specific gravity of 3 to 6.

13. A magnetic recording medium according to one of claims 3 or 4, wherein said non-magnetic powder of the lower layer is processed by surface treatment.

* * * * *